3,198,817
INSOLUBLE CHELATES OF TITANIUM, ZIRCONIUM, HAFNIUM AND THORIUM
Horst G. Langer, Cochituate, Mass., assignor to The Dow Chemical Company, Midland, Mich., a corporation of Delaware
No Drawing. Filed Nov. 8, 1960, Ser. No. 67,919
8 Claims. (Cl. 260—429.1)

This invention relates to new compounds of titanium, zirconium, hafnium and thorium which may be characterized as the tetravalent metal chelates of certain synthetic alkylene polyamino acetic acid chelating agents, wherein the compounds are characterized by the fact that they are chelates of these organic materials and are essentially insoluble in water.

A unique characteristic of metals such as titanium, zirconium and hafnium is that they cannot be prepared in certain forms. These compounds are largely known in the form of the tetra halide and have the very distinctive property that they cannot be put in aqueous solution, because contact with water vapor alone is sufficient to hydrolyze the materials to the hydroxide and corresponding acid.

In certain industrial applications, it is desirable to prepare these compounds in pure form or rather these metals in pure form. For example, by electrolysis and it is, accordingly, necessary to have the metals in solution in various special forms.

It is, accordingly, a fundamental object of this invention to provide a new series of titanium, zirconium, hafnium and thorium compounds in substantially water insoluble form which compounds are useful in virtually any application where the metal is needed.

It is another object of the invention to provide a method for the preparation of such compounds.

Other objects and advantages of the invention will in part be obvious and in part appear hereinafter.

The invention, accordingly, is embodied in a sequence of titanium, zirconium, hafnium, and thorium compounds which are characterizable as water insoluble tetravalent metal chelates of alkylenepolyaminoacetic acid type chelating agents. More particularly, the structure of the compounds may be understood by reference to the following:

$$MX$$

wherein M represents the tetravalent metal, that is, titanium, zirconium, hafnium, or thorium, and wherein the X is a radical formulated by reference to the following:

$$(HOOCCH_2)_2N.R$$

Wherein R is selected from the group consisting of H and $$[(CH_2)_nN(CH_2COOH)]_mCH_2COOH$$

wherein $n$ is an integer which is 2, 3, or 4 and $m$ is an integer having a value of 0, 1, 2, 3 or 4, $x$ is an integer having a value of 0, 1, 2, 3 or 4. In formulating the alkylenepolyamine chelating portion of the molecule, any 1 or 2 of the acetic acid or carboxymethyl groups may be replaced by a beta hydroxyethyl group. Similarly the acetic acid moiety may be replaced by a propionic acid moiety. In general, these chelating agents will be used as their alkali metal salts.

Taking ethylenediaminetetraacetic acid as the type compound and titanium as the metal, the formula of the new compound can be given as follows:

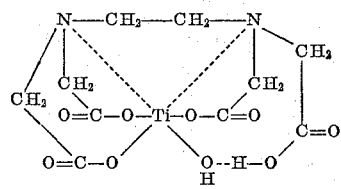

With zirconium, the probable formula of the chelating agent reacted with the metal to form the chelate is as follows:

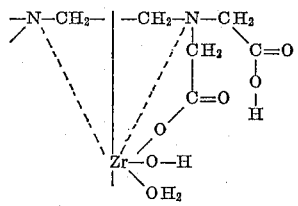

Hafnium gives the same kind of structure as does the zirconium compound.

With respect to thorium, I have found experimentally that 2 molecules of thorium are bound to 2 molecules of ethylenediamine-tetraacetic acid to form a polynuclear molecule substantially in the following fashion.

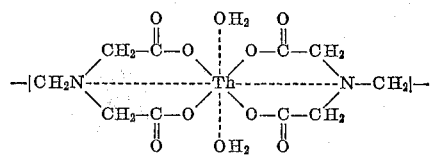

It is possible also that one ethylenediaminetetraacetic acid molecule could wrap itself around the thorium atom and thereby utilize all four acetic acid moieties of the chelating agent to bind the metal substantially in accordance with the scheme sketched for titanium.

The details of the preparation of metal chelates in according with this invention are better understood by reference to the following specific examples.

*Example I*

0.02 mole of $Na_2H_2$ ethylenediaminetetraacetic acid is dissolved in 50 milliliters of water. The solution is stirred at room temperature and 0.02 mole of $TiCl_4$ is added dropwise. Immediate precipitation occurs together with pH drop to about pH 1. The crude product is obtained in almost quantitative yields and can be recrystallized from large amounts of water by successive percolation.

*Example II*

0.02 mole of ethylenediaminetetraacetic acid is dissolved in 500 milliliters of hot water. The hot solution is stirred vigorously and 0.02 mole of $ZrCl_4$ is added in one addition. A clear solution is obtained from which the crystalline product is obtained in quantitative yields after cooling.

The same procedure is used to prepare the hafnium compound by substituting hafnium tetrachloride for the zirconium tetrachloride.

Example III 0.01 mole of EDTA acid or its disodium salt is dissolved in 500 milliliters of hot water. After addition of 0.01 mole of solid ThCl$_4$ the chelate starts to crystallize. Practically quantitative yields can be achieved by addition of alcohol or further concentration of the solution.

Operating in similar fashion we have found that titanium tetrachloride, zirconium tetrachloride, hafnium tetrachloride and thorium tetrachloride may all be readily reacted with aqueous solutions of the chelating agents to form chelates in accordance with this invention. As for the ligand, that is the chelating agent portion of the reaction, the ethylenediaminetetraacetic acid, hydroxyethylethylenediaminetriacetic acid and ethylenediamine (2-o-hydroxyphenyl) glycine may be used. In general therefore, virtually any salt of any metal in group IV–B of the periodic chart may be used to react with the ligand molecules which in general are polyamino polycarboxylic acid compounds but may also contain hydroxyethyl groups and methylene phosphonic acid groups as part of the chelating structure. More specifically, typical chelating agents are nitrilo diacetic acid, nitrilotriacetic acid, ethylenediaminetetraacetic acid, diethylenetriaminepentaacetic acid and the like.

In general the procedure for the preparation of any of the chelates is essentially that of Example I. The formation of this family of essentially insoluble chelates by this method is a novel reaction, because the several tetrachlorides used as raw materials hydrolyze freely to oxides, oxychlorides and hydrogen chloride when they contact water or moist air. Yet upon contact with the chelating agent solution under the reaction conditions as described in Example I, the metal reacts readily to form the precipitate of the insoluble chelating agent.

The preparations in accordance with the method of this invention are preferably carried out at temperatures near boiling, but these may be reduced from that level provided all of the chelating agent used is in solution; thus, complete solution of the chelating agent in liquid phase for carrying out the reaction are the preferred conditions. In general, the reaction will be virtually instantaneous so that the time of reaction is merely that time which is necessary to complete the addition of the metal salt and, thereafter, the cooling of the solution.

The proportions of ingredients to be employed in a reaction should be, of course, based on the molar ratio of metal to chelating agent which it is desired to maintain. In general, the chelating agents react on a 1 to 1 basis.

The reaction, however, will proceed satisfactorily even though the ideal stoichiometric ratio is not maintained so long as the concentration of reactants in the solution is sufficient to exceed the solubility product. Thus the ratio of reactants can be varied within a general factor away from the 1 to 1 molar ratio preferred. Actually variation from the ideal can be as much as by a factor of 10.

At about pH 5 the sodium salt of the metal chelate is formed, which has some degree of solubility. Generally, therefore, it is preferable to maintain a pH of the solution in which the product is formed below about 5; the complex is actually formed at pH as low as 1.

In general, the alkali metal salt form of the chelating agent will have a pH in solution such that the addition of the TiCl$_4$, ZrCl$_4$; HfCl$_4$ or ThCl$_4$ will reduce the pH to a level favorable to formation of the chelate desired.

The insoluble chelate compounds of this invention based on ethylenediaminetetraacetic acid are crystalline solids, as are those of the trimethylenediaminetetraacetic acid, whereas the compounds of the tetramethylenediaminetetraacetic acid are microcrystalline in form. The components have a very slight degree of solubility in water, which at greatest approaches 1 part per 100 parts of water. In all cases of the compounds prepared, melting points or decomposition temperatures were found to be higher than 300° C.

When the compounds are dissolved in water, i.e., to the limited extent their solubility permits, the solutions are acid; i.e., these chelates are acids.

This form of metal chelates gives unique advantages for many purposes. The insolubilization in acid solutions makes the reaction useful in the separation of these metals from acid leach liquors. In plating baths and similar applications the metal chelates are very useful because they make possible close control of the composition of the plating bath. This is, the low solubility places in solution a small quantity of the metal ion, excess solid chelate in the bath acting as a reservoir for additional ions.

Thus, the reservoir of the metallic ions being substantially insoluble, provides a source of low level concentration of ions in many applications such as biological situations, agricultural and electroplating uses. Also, these compounds are useful for incorporating these metals as stabilizers into other substances; and possible test sources of metals in textile or tanning processes.

Though the invention has been described in terms of only a few specific examples, it is to be understood that variants thereof may be adopted without departing from its spirit or scope.

In formulating the structure of these chelates which, it is noted, precipitate when formed in an aqueous medium, they are written as hydrates in order to take care of the full coordination numbers of the metals involved. The evidence for so doing is based on the fact, for example, in the case of titanium that the coordination number calls for the monohydrate form of the compound. However, the infra red absorption spectrum shows a free COOH group in the crystallized form of the compound and, accordingly, to take care of the hydration and the presence of the free carboxyl group, the formula is so written.

With propionic acid moieties in place of the acetic acid moieties the chain of the molecule will be longer and possibly it might reach around the metal atom to form an anhydrous chelate.

It is this kind of evidence, the coordination number of the compound, plus analysis of the compound, and examination of the absorption spectrum which leads to the formulation of the compound to be as follows:

Titanium·ethylenediaminetetraacetic acid·H$_2$O
Zirconium·ethylenediaminetetraacetic acid·4H$_2$O
Hafnium·ethylenediaminetetraacetic acid·4H$_2$O
Thorium·ethylenediaminetetraacetic acid·2H$_2$O

What is claimed is:

1. A solid crystalline metal chelate in acid form corresponding to the following:

$$M \cdot X$$

wherein the metal M is selected from the group consisting of titanium, zirconium, hafnium and thorium in the tetravalent form, and X represents a chelating radical formulated in accordance with the following:

$$(HOOCCH_2)_2N \cdot R \cdot (H_2O)_x$$

wherein R is selected from the group consisting of H and $$-[(CH_2)_nN(Y)]_mY$$

wherein Y is independently selected from the group consisting of hydroxyethyl groups, —CH$_2$COOH and —CH$_2$CH$_2$COOH, not more than two Y's being hydroxyethyl; $n$ is an integer having a value in the range 2, 3, 4 and $m$ is in integer having a value in the range 0, 1, 2, 3, 4; $x$ is an integer having a value in the range 0, 1, 2, 3, 4.

2. A compound in accordance with claim 1 which is the tetravalent titanium chelate of ethylenediaminetetraacetic acid.

3. A compound in accordance with claim 1 which is the tetravalent zirconium chelate of ethylenediaminetetraacetic acid.

4. A compound in accordance with claim 1 which is the tetravalent hafnium chelate of ethylenediaminetetraacetic acid.

5. A compound in accordance with claim 1 which is the tetravalent thorium chelate of ethylenediaminetetraacetic acid.

6. A compound in accordance with claim 1 which is the tetravalent hafnium chelate of ethylenediamine-(2-o-hydroxyphenyl) glycine.

7. A compound in accordance with claim 1 which is the tetravalent zirconium chelate of ethylene diamine-(2-o-hydroxyphenyl) glycine.

8. The method of forming an acid chelate of a metal selected from the group consisting of tetravalent titanium, zirconium, hafnium, and thorium, which comprises forming a concentrated solution of the chelating agent, maintaining said solution at a temperature close to boiling, mixing said solution with the metal compound to be converted into its chelate, bringing it entirely into solution, thereafter, cooling said solution to separate therefrom the crystalline water insoluble form of the acid metal chelate.

References Cited by the Examiner

UNITED STATES PATENTS 2,925,431　2/60　Choppin et al. _____ 260—429.1

OTHER REFERENCES

Martell et al.: "Chemistry of the Metal Chelate Compounds," p. 324 (1952).

The Van Nostrand Chemist's Dictionary, D. Van Nostrand, Inc., New York, 1953, page 143.

Spedding et al.: "J.A.C.S.," Vol. 78, No. 1, pp. 34–37, Jan. 5, 1956.

Courtney et al: "J.A.C.S.," Vol. 80, No. 9, pp. 2121–2128, June 16, 1958.

Sawyer et al.: "J.A.C.S.," Vol. 82, No. 16, pp. 4191–4196, August 20, 1960.

CARL D. QUARFORTH, *Primary Examiner.*

REUBEN EPSTEIN, *Examiner.*